United States Patent
Tessnow et al.

(10) Patent No.: US 7,618,171 B2
(45) Date of Patent: Nov. 17, 2009

(54) LIGHT EMITTING DIODE MODULE FOR AUTOMOTIVE HEADLAMP

(75) Inventors: Thomas Tessnow, Weare, NH (US); Michael Tucker, Henniker, NH (US); Ralph Johnson, Bedford, NH (US); Steven Sidwell, Hopkinton, NH (US)

(73) Assignee: OSRAM SYLVANIA Inc., Danvers, MA (US)

( * ) Notice: Subject to any disclaimer, the term of this patent is extended or adjusted under 35 U.S.C. 154(b) by 60 days.

(21) Appl. No.: 11/121,230

(22) Filed: May 3, 2005

(65) Prior Publication Data
US 2006/0087861 A1 Apr. 27, 2006

Related U.S. Application Data

(60) Provisional application No. 60/620,933, filed on Oct. 21, 2004.

(51) Int. Cl.
F21V 9/00 (2006.01)
F21V 21/00 (2006.01)
F21S 8/00 (2006.01)

(52) U.S. Cl. ...................... 362/511; 362/545
(58) Field of Classification Search ............ 362/511, 362/545
See application file for complete search history.

(56) References Cited

U.S. PATENT DOCUMENTS

| 5,257,173 A | 10/1993 | Ohmamyuda et al. ....... 362/235 |
| 5,590,945 A * | 1/1997 | Simms ........................ 362/545 |
| 5,676,446 A * | 10/1997 | Gold ........................... 362/511 |
| 5,784,203 A | 7/1998 | Beckmann .................. 359/618 |
| 6,443,582 B1 * | 9/2002 | Tarne et al. ................. 362/555 |
| 6,585,402 B2 * | 7/2003 | Ohkodo et al. .............. 362/554 |
| 6,682,211 B2 * | 1/2004 | English et al. .............. 362/545 |
| 2002/0172053 A1 * | 11/2002 | Pastrick et al. ............. 362/511 |
| 2004/0145457 A1 * | 7/2004 | Schofield et al. ......... 340/425.5 |
| 2004/0149998 A1 | 8/2004 | Henson et al. |
| 2004/0196667 A1 * | 10/2004 | Lea ............................. 362/555 |
| 2005/0018429 A1 * | 1/2005 | Brandenburg et al. ....... 362/539 |
| 2006/0087840 A1 * | 4/2006 | Franklin et al. ............. 362/228 |

FOREIGN PATENT DOCUMENTS

DE 10139578 4/2003
DE 10149837 5/2003

OTHER PUBLICATIONS http://www.riverdeep.net/current/2002/01/010702_light_tg.jhtml.*

* cited by examiner

Primary Examiner—Sandra L O'Shea
Assistant Examiner—William J Carter
(74) Attorney, Agent, or Firm—William H. McNeill

(57) ABSTRACT

A light gathering module (10) has a body (12) with a first end (14) comprising a single light transmitting surface (16) and a second end (18) having a plurality of arms (20), each arm (20) having an independent light gathering terminus (22) that is rectangular. In a preferred embodiment of the invention, the first end (14) of the body also is rectangular. The light gathering module (10) can be fabricated from acrylic, plastic, glass or other suitable material and preferably has no cladding so that light output I maximized. When combined in a housing (32) with a projector lens (34) the light gathering module (10) provides a vehicle headlamp (30).

3 Claims, 3 Drawing Sheets

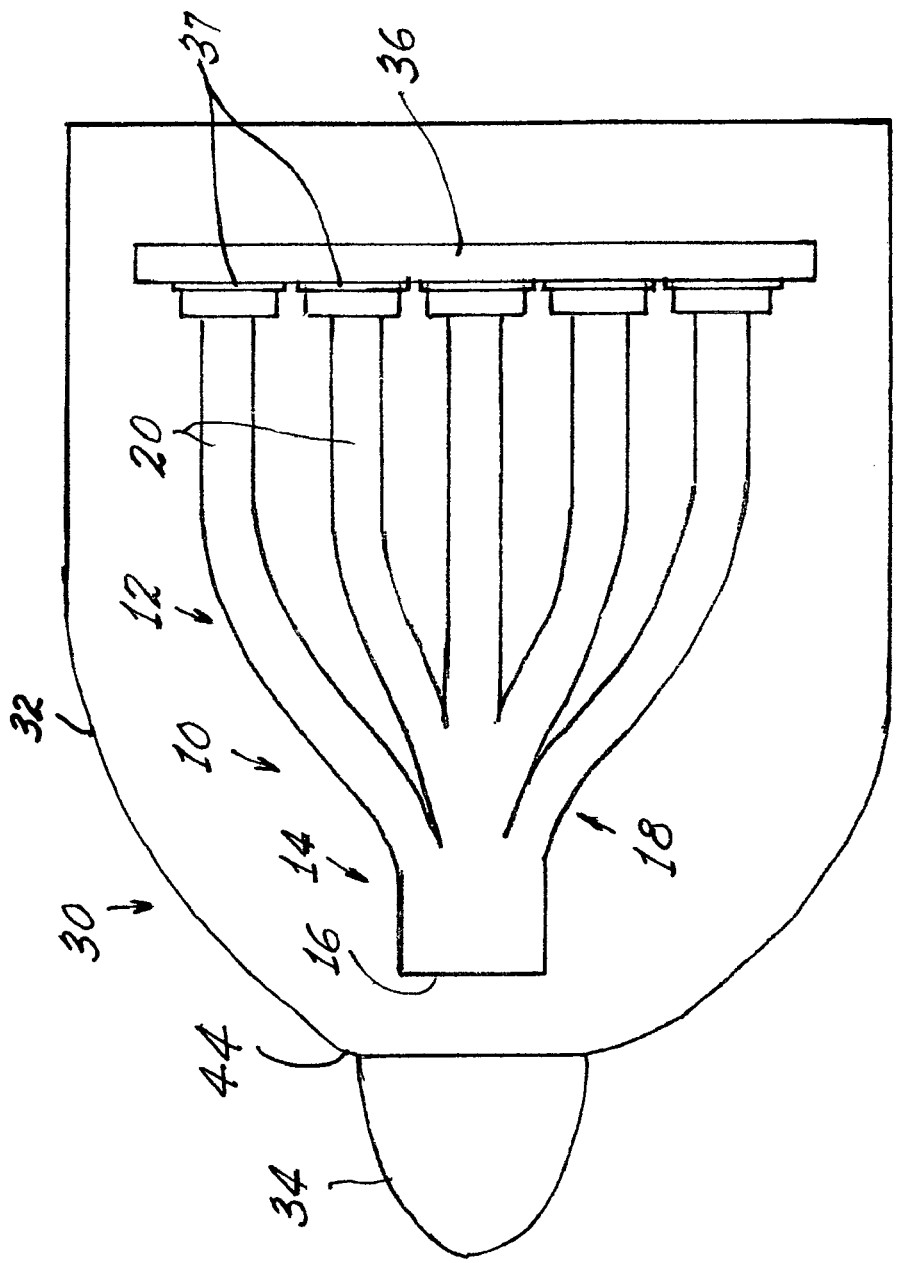

LIGHT EMITTING DIODE MODULE FOR AUTOMOTIVE HEADLAMP

CROSS-REFERENCE TO RELATED APPLICATIONS

This application claims priority from Provisional Patent Application Ser. No. 60/620,933, filed Oct. 21, 2004.

TECHNICAL FIELD

This invention relates to automotive headlights and more particularly to such headlights employing light emitting diodes (hereafter, LED or LEDs). Still more particularly it relates to a headlight using multiple LEDs but emulating a point source, allowing the light source to be used with, for example, a projector lens.

BACKGROUND ART

The long-life and appreciable ruggedness of LED light sources has produced a desire to use such light sources in automotive applications. Currently, these applications have been limited to stop lights and taillights and internal illumination. Recently developed LEDs capable of emitting white light have suggested that they might also be used for headlights. For example, U.S. Pat. No. 6,406,172 teaches the employment of multiple red, green and blue emitting LEDs arranged in a matrix, whose light is blended to emit a version of white light. The light output can also be varied by computer control and can accommodate directional variation by the vehicle with which they are used.

Newer versions of white light emitting LEDs employ blue and ultra violet-emitting LED sources in combination with a yellow light emitting phosphor, which blends the output into a white light A lamp has recently been proposed that comprises a housing having a base with a circumferential wall arranged about a longitudinal axis; a hollow body projecting from the base that is symmetrically arrayed about the longitudinal axis; a light guide having a single output end arrayed along the longitudinal axis and having a plurality of radially extending arms, each of the arms having an input end; and a like plurality of light emitting diodes operatively positioned with respect to the radially extending arms. In a preferred embodiment of the invention the light emitting diodes are arrayed about the circumferential wall. This latter approach is described in Provisional Patent Application Ser. No. 60/612,080, filed Sep. 22, 2004. While it provides a workable solution, the arms of the guide generally encompass only a single LED. Accordingly, it would be an improvement to provide a light gathering module, and a lamp employing the light gathering module, wherein each arm of the module encompasses multiple LEDs, thus increasing the light output while reducing the number of optical elements required.

DISCLOSURE OF INVENTION

It is, therefore, an object of the invention to obviate the disadvantages of the prior art.

It is another object of the invention to provide a light guide, or light gathering module, that can encompass multiple LEDs.

It is another object of the invention to provide a standard LED light source with a defined emitting surface independent of the number of LEDs.

These objects are accomplished, in one aspect of the invention, by the provision of a light gathering module comprising a unitary body with a first end comprising a single light transmitting surface; and a second end comprising a plurality of arms, each arm having an independent light gathering terminus that is rectangular. The use of the rectangular terminus for the arms allows each arm to collect the light from multiple LEDs.

The objects are further accomplished, in another aspect of the invention, by an automotive headlamp comprising a housing; a lens in a front portion of the housing; and the light gathering module described above positioned in the housing. The first end of the module is operatively associated with the lens. The unit is small and compact and provides and efficient light source for a vehicle headlamp.

BRIEF DESCRIPTION OF THE DRAWINGS

FIG. 4 is a diagrammatic view of an automotive headlamp; and

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
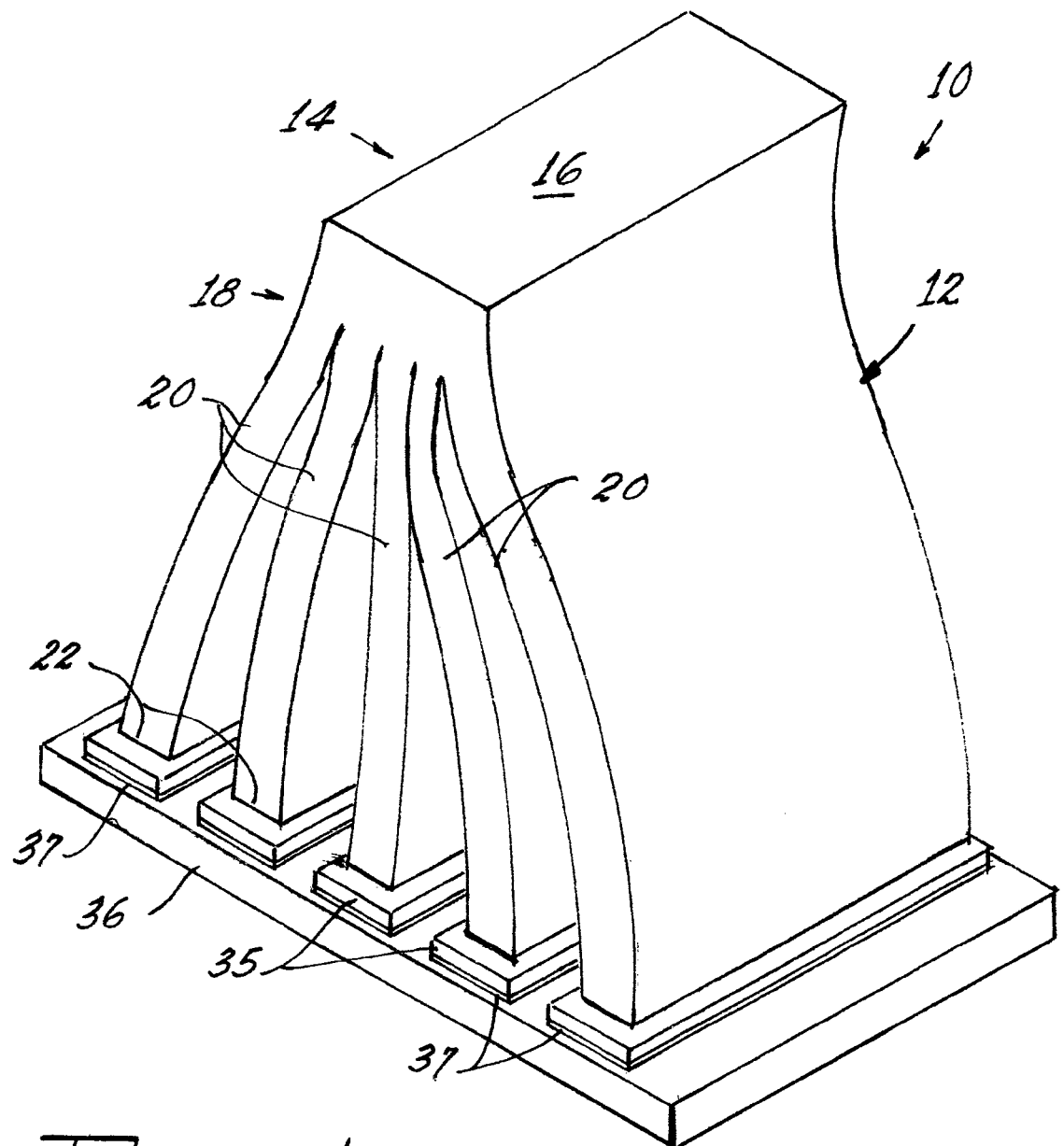
FIG. 1 is a perspective view of an embodiment of a light gathering module in accordance with an aspect of the invention.

Referring now to the drawings with greater particularity, there is shown in FIG. 1 a light gathering module 10 having a unitary body 12 with a first end 14 comprising a single light transmitting surface 16 and a second end 18 having a plurality of arms 20, each arm 20 having an independent light gathering terminus 22 that is rectangular. In a preferred embodiment of the invention, the first end 14 of the body also is rectangular. The light gathering module 10 can be fabricated from acrylic, plastic, glass or other suitable material and preferably has no cladding so that light output is maximized. By fabricating the light gathering 10 from a single piece, the necessity of orientating a large number of individual fibers is eliminated.

Figure 2:
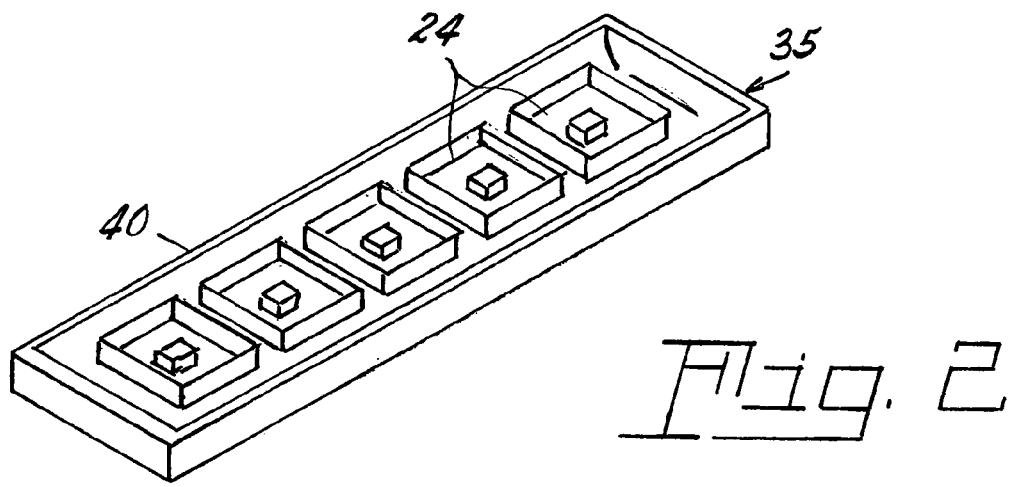
FIG. 2 is a perspective view of an LED housing that can be used with the invention.
Figure 5:
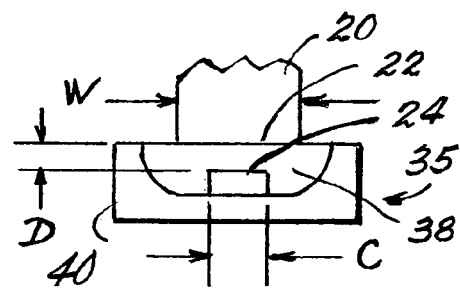
FIG. 5 is an end view of the LED housing illustrating some desired relationships.
Figure 3:
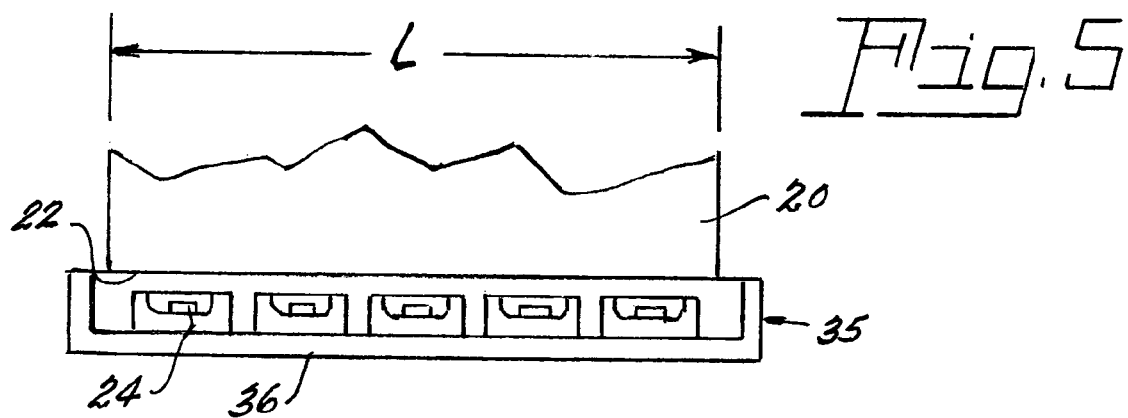
FIG. 3 is an elevational view, partially in section, of the LED housing and an arm of the light gathering module.

Light emitting diodes 24 are positioned in a housing 35 that is associated with each termini 22. The LEDs can be individual LEDs packaged as a unit, as shown in FIGS. 2 and 3, or they could be in a single package with multiple chips. The spacing of the LEDs can also be regulated by putting the LEDs closer together by wire-bonding to the side. Further, the LEDs can be mounted directly to a board such as a ceramic or metal-core printed circuit board. In a preferred embodiment of the invention each diode chip is 1 mm square, as indicated by "C" in FIG. 5, and five chips are arranged longitudinally across 5.4 mm, preferably with spacing between chips of about 100 um. The light guide arms have a length "L" of 6 to 7 mm and a width "W" of approximately 2 mm. Housings 35 with more or less than five chips can, of course, by utilized if necessary.

The housings 35 are preferably mounted upon a thermally transmissive ceramic 37, which, in turn, is mounted upon a heat sink 36, which can be aluminum or copper.

An optical encapsulant 38 fills the space between the walls 40 of the housing 35 and extends a distance "D" above the surface of the LED. To insure good optical coupling, "D" should be small relative to "W".

An automotive headlamp 30 including the light gathering module 10 is shown diagrammatically in FIG. 4 and has a housing 32 with a lens 34 in a front portion 44 thereof. Preferably, the lens 34 is a projector lens. The light gathering module 10 is positioned in the housing 32 with the first end 14 being operatively associated with the lens 34. Preferably the output end of module 12 is located near a focal point of the lens 34.

For purposes of a vehicle headlamp or backup light, the LEDs ideally emit white light, such as from known LEDs having surface emission combined with a phosphor; however, other colors can be utilized.

Electrical connections to the LEDs (not shown) can be made in any suitable manner, including via a printed circuit board. The size and thermal capabilities of the heat sink will depend upon multiple factors, including the efficacy of the LEDs and the amount of power necessary to drive them.

Accordingly, there is provided a viable headlamp for a vehicle that is economical to manufacture and has superior light gathering capabilities due to the configuration of the light gathering module.

While there have been shown and described what are present considered to be the preferred embodiments of the invention, it will be apparent to those skilled in the art that various changes and modifications can be made herein without departing from the scope of the invention as defined by the appended claims.

What is claimed is:

1. An automotive headlamp for forward road illumination comprising:
    a housing;
    a piano-convex projector lens in a front portion of said housing;
    a light gathering module positioned in said housing, comprising:
    a rigid body with a first end comprising a single light transmitting surface opposite a second end comprising a plurality of arms, each arm having an independent light gathering terminus that is rectangular and encompasses a plurality of light emitting diodes, said first end being operatively associated with said plane side of said piano-convex projector lens.

2. The automotive headlamp of claim 1 wherein said first end of said body is rectangular.

3. The automotive headlamp of claim 1 wherein said light emitting diodes are mounted in housings and said housings are mounted upon a heat sink.

* * * * *